US012750330B2

(12) United States Patent
Wang et al.

(10) Patent No.: US 12,750,330 B2
(45) Date of Patent: Sep. 29, 2026

(54) METHOD, APPARATUS AND ELECTRONIC DEVICE FOR INFORMATION PROCESSING FOR CHANGING OPERATION PERMISSIONS IN MESSAGING SESSIONS

(71) Applicant: Beijing Zitiao Network Technology Co., Ltd., Beijing (CN)

(72) Inventors: Lingyu Wang, Beijing (CN); Jing Liu, Beijing (CN); Changxiong Song, Beijing (CN); Jinghong Xia, Beijing (CN); Jianfeng Liang, Beijing (CN); Zhuo Bao, Beijing (CN); Zigeng Feng, Beijing (CN); Tingting Jiang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/622,797

(22) Filed: Mar. 29, 2024

(65) Prior Publication Data

US 2024/0244015 A1 Jul. 18, 2024

(30) Foreign Application Priority Data

Mar. 31, 2023 (CN) ......................... 202310341624.9

(51) Int. Cl.
*H04L 51/04* (2022.01)
*H04L 9/40* (2022.01)

(52) U.S. Cl.
CPC ............ *H04L 51/04* (2013.01); *H04L 63/102* (2013.01)

(58) Field of Classification Search
CPC ...... H04L 51/04; H04L 63/102; H04L 63/104
See application file for complete search history.

(56) References Cited

U.S. PATENT DOCUMENTS 10,547,575 B2 * 1/2020 Cohen ...................... H04L 51/18
11,695,580 B2 * 7/2023 Skiff ....................... H04L 51/04 709/204

(Continued)

FOREIGN PATENT DOCUMENTS

CN 1988516 A 6/2007
CN 106603384 A 4/2017

(Continued)

OTHER PUBLICATIONS

International Search Report for PCT/CN2024/079424, mailed May 9, 2024, 7 pages.

(Continued)

*Primary Examiner* — Nicholas R Taylor
(74) *Attorney, Agent, or Firm* — Astute IP Law Group

(57) ABSTRACT

This disclosure provides a method, apparatus and electronic device for information processing. A specific implementation of the method includes: receiving a first setting operation performed by a first user on a first session message in a target session, wherein the first user is a member of the target session, and the first session message comprises one or more session messages in the target session; in response to the first setting operation, changing a first operation permission of at least part of members of the target session on the first session message to a second operation permission; wherein a permission scope of the second operation permission is less than a permission scope of the first operation permission.

18 Claims, 17 Drawing Sheets

(56) References Cited

U.S. PATENT DOCUMENTS

| | | | | |
|---|---|---|---|---|
| 11,792,076 | B2 * | 10/2023 | Nadir | H04L 41/0894 709/224 |
| 2022/0294774 | A1 * | 9/2022 | Voss | H04W 12/08 |
| 2023/0208663 | A1 * | 6/2023 | Jovanovic | H04N 7/147 709/204 |
| 2024/0259384 | A1 * | 8/2024 | Monroe, II | H04L 51/04 |

FOREIGN PATENT DOCUMENTS

| | | | |
|---|---|---|---|
| CN | 110417638 | A | 11/2019 |
| CN | 110661694 | A | 1/2020 |
| CN | 111669311 | A | 9/2020 |
| CN | 112333081 | A | 2/2021 |
| CN | 113300933 | A | 8/2021 |
| CN | 113438146 | A | 9/2021 |
| CN | 115242742 | A | 10/2022 |
| CN | 115374451 | A | 11/2022 |
| CN | 115865852 | A | 3/2023 |
| CN | 115967692 | A | 4/2023 |
| CN | 116545966 | A | 8/2023 |
| JP | 2016540325 | A | 12/2016 |
| JP | 2019012522 | A | 1/2019 |
| JP | 2023020625 | A | 2/2023 |
| WO | 2022161431 | A1 | 8/2022 |
| WO | 2023025234 | A1 | 3/2023 |

OTHER PUBLICATIONS

Office Action for Chinese Patent Application No. 202310341624.9, mailed on Sep. 12, 2025, 21 pages.

Office Action for Japanese Patent Application No. 2025-509112, mailed on Apr. 21, 2026, 10 pages.

* cited by examiner

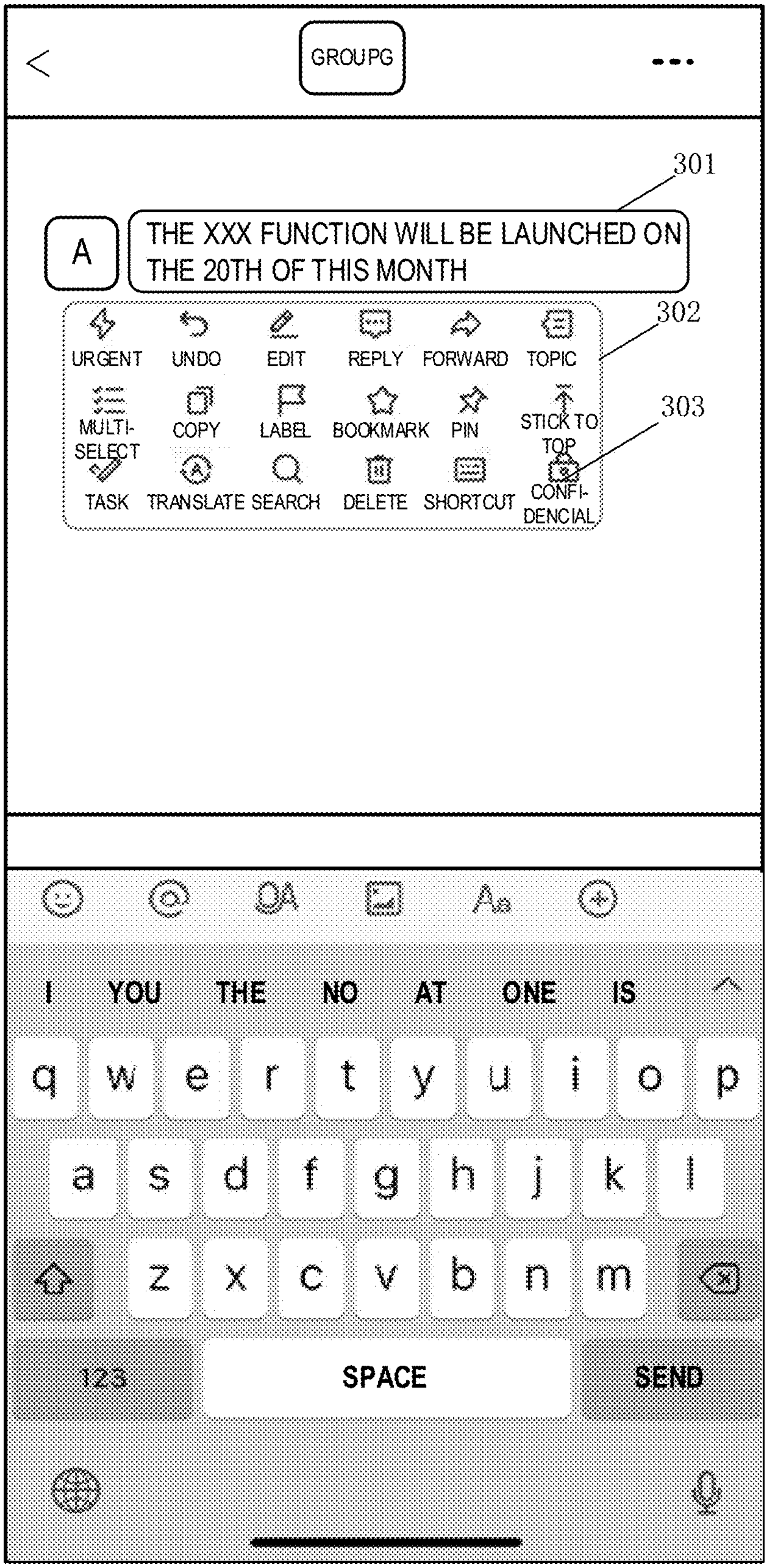
FIG. 3a1

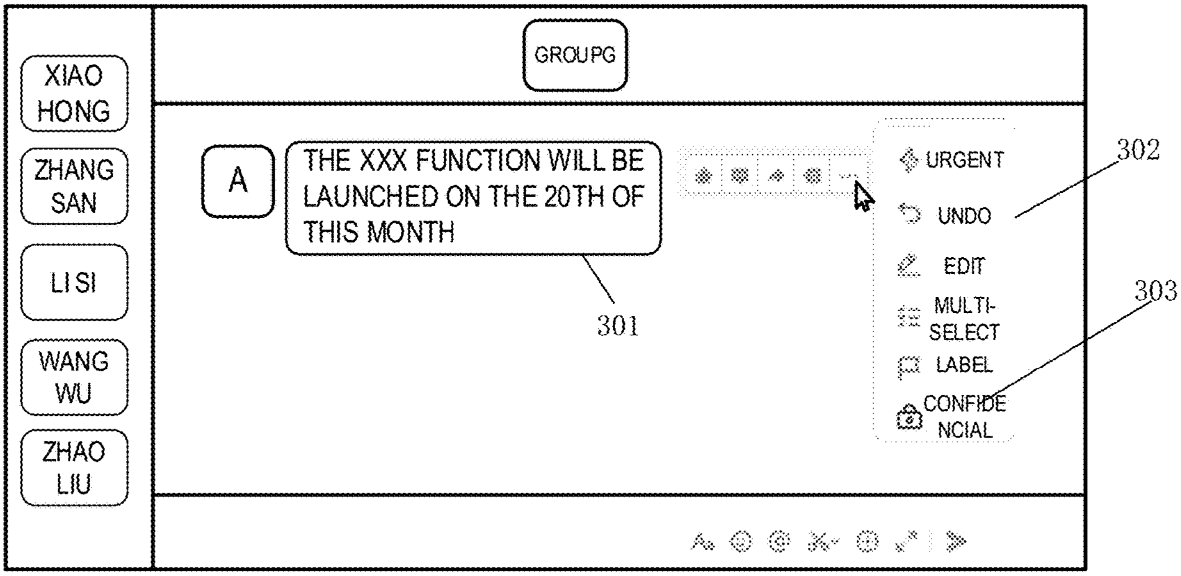
FIG. 3a2

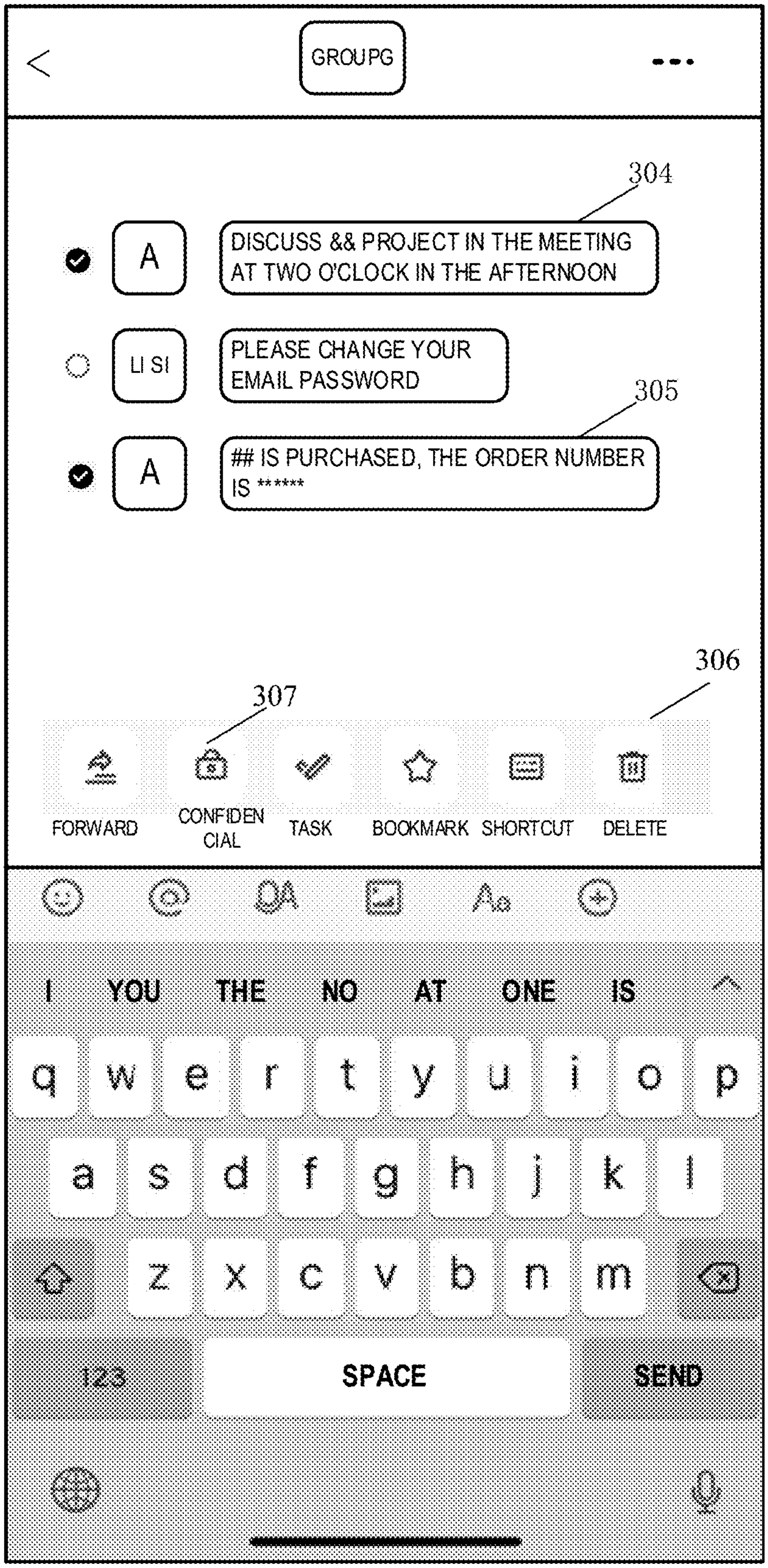
FIG. 3b1

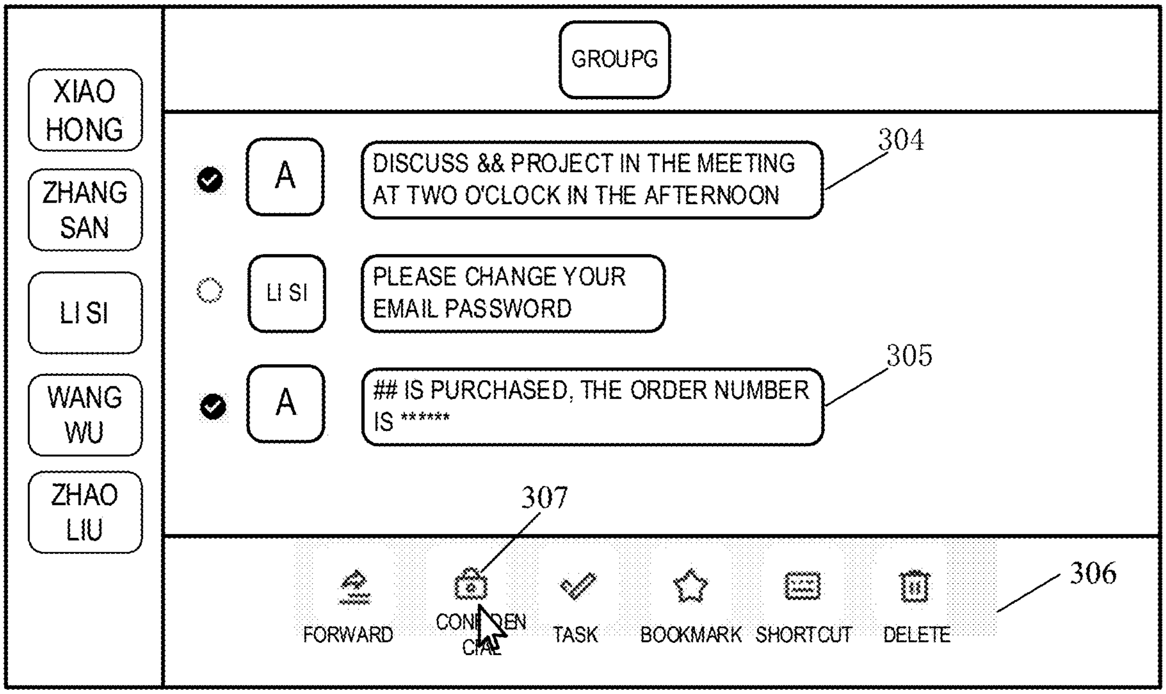
FIG. 3b2

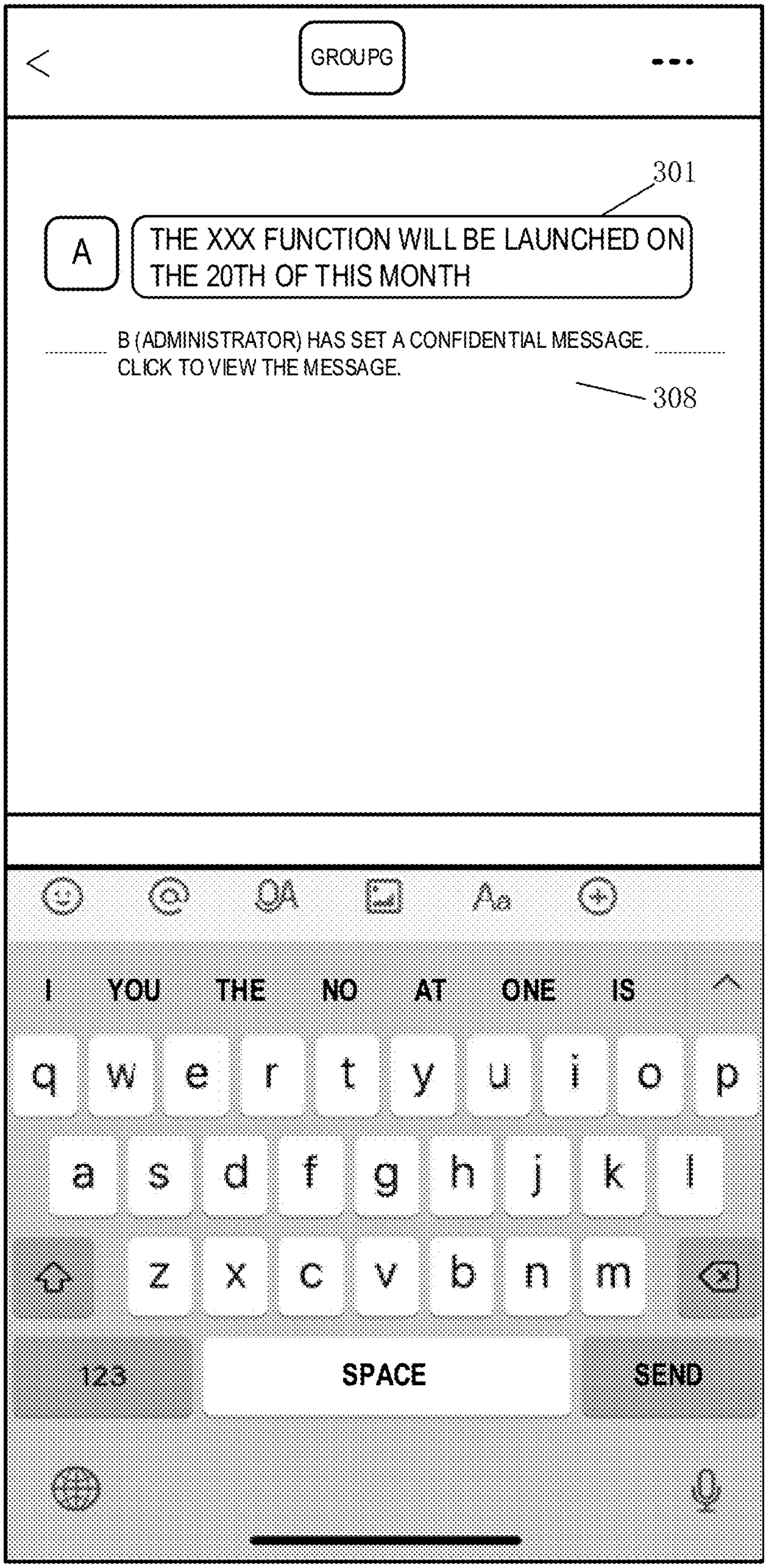
FIG. 3c1

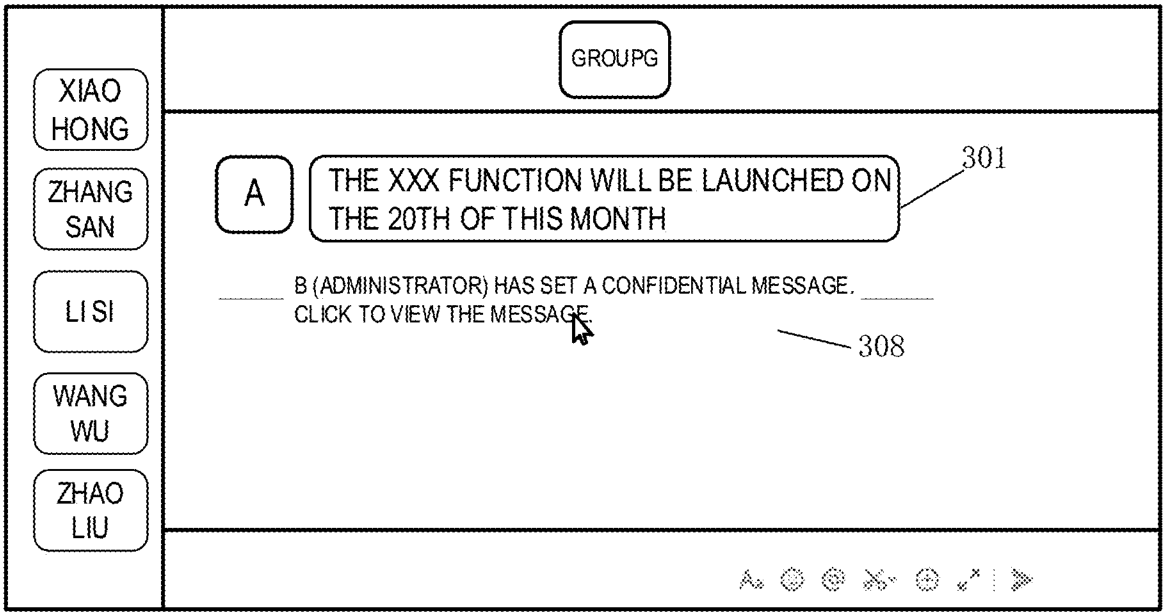
FIG. 3c2

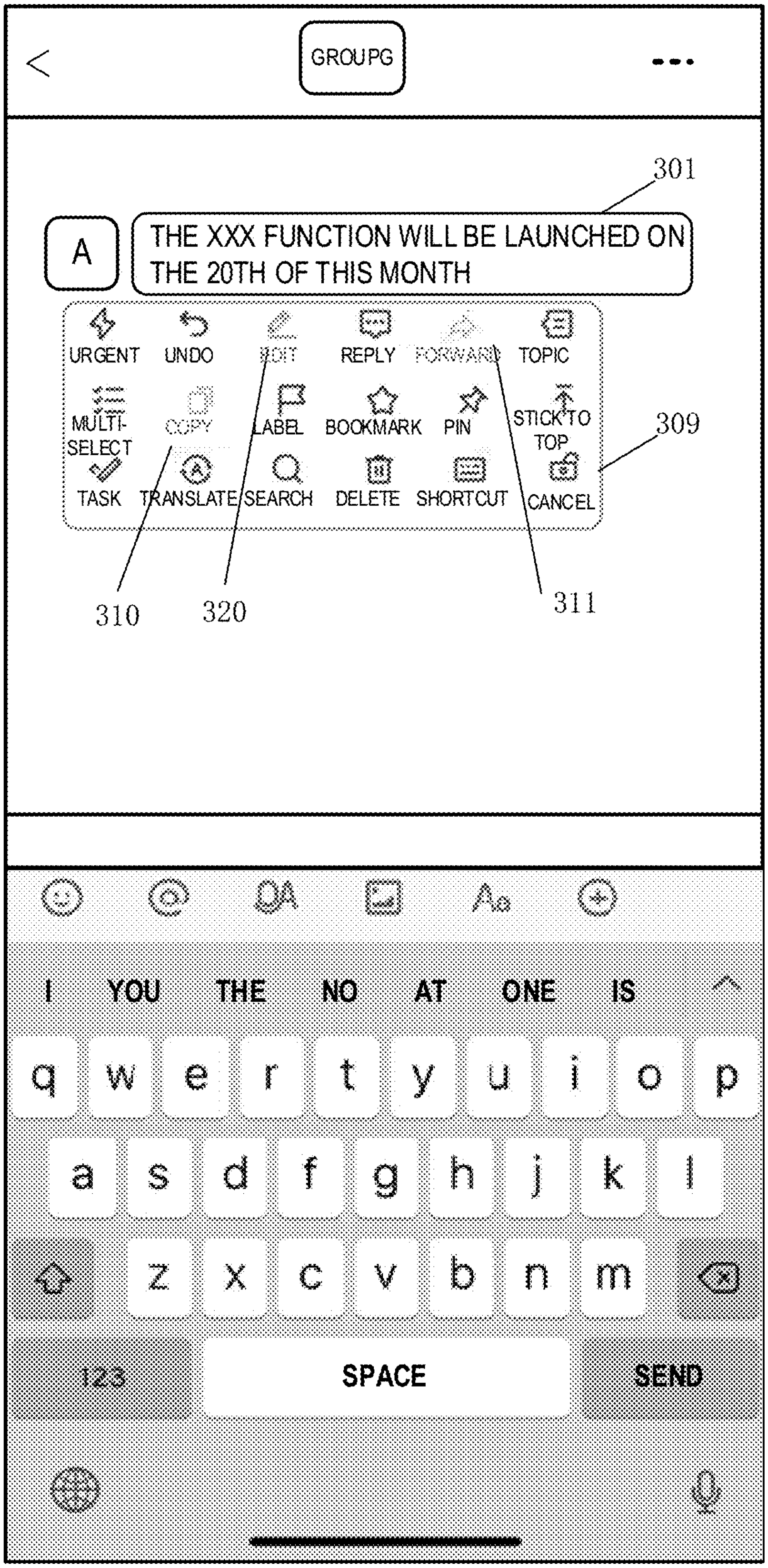
FIG. 3d1

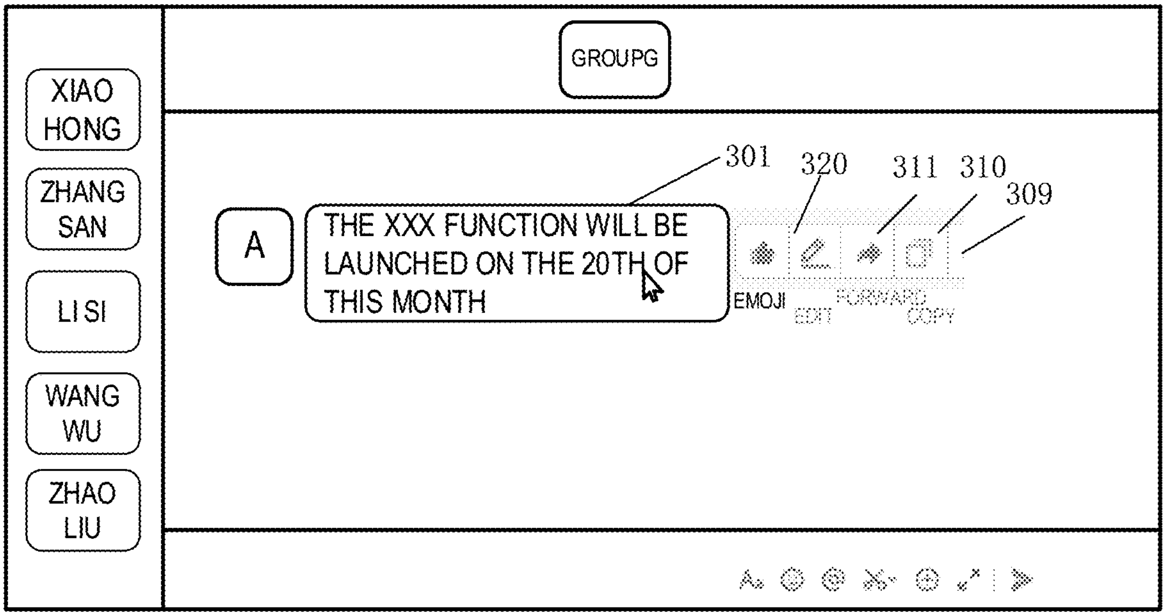
FIG. 3d2

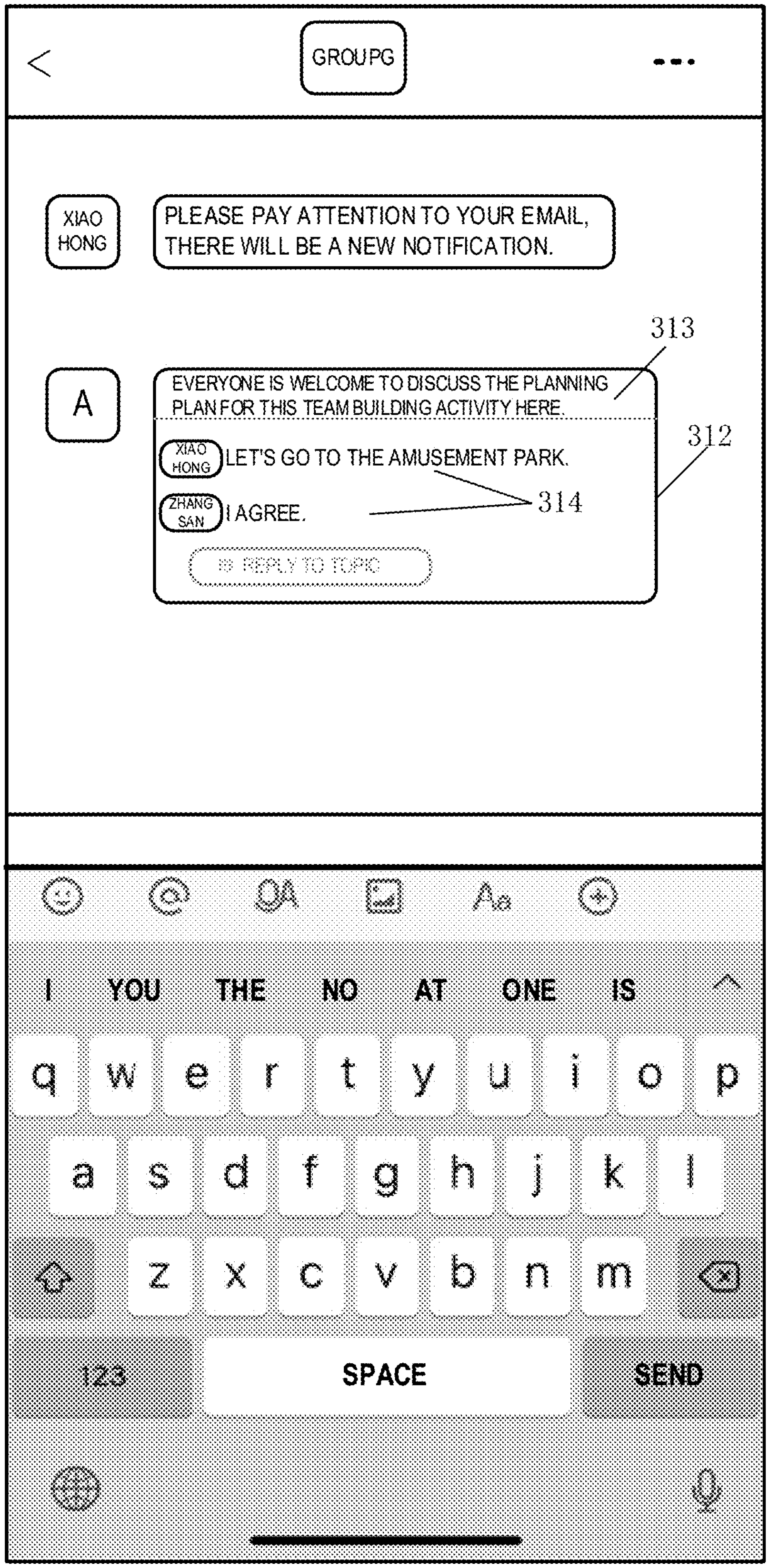
FIG. 3e1

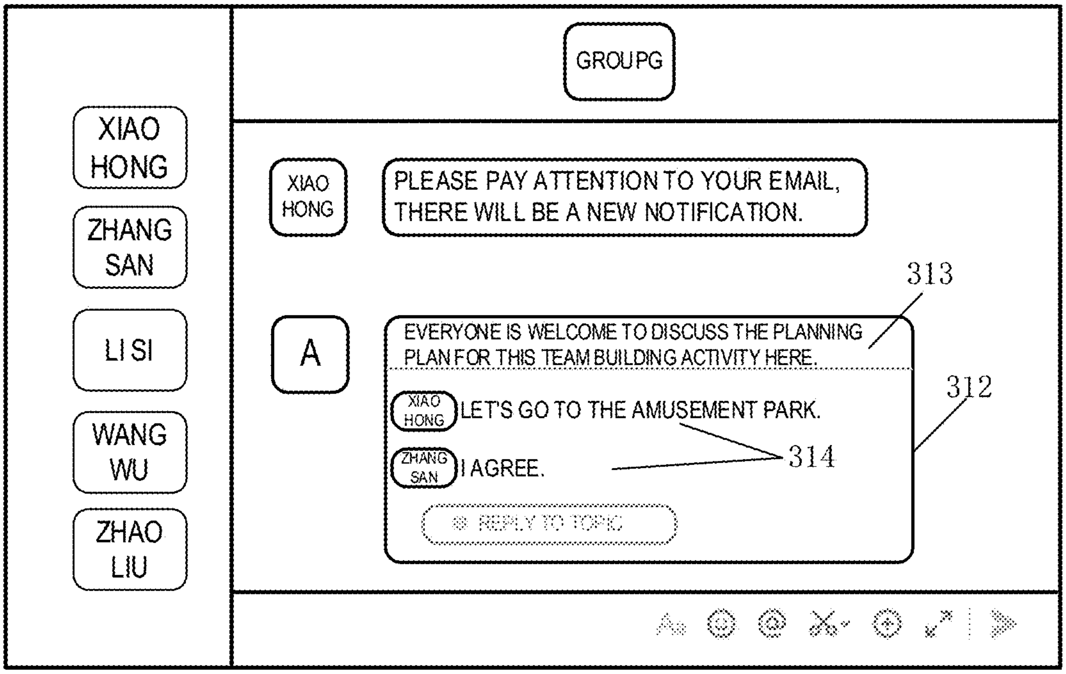
FIG. 3e2

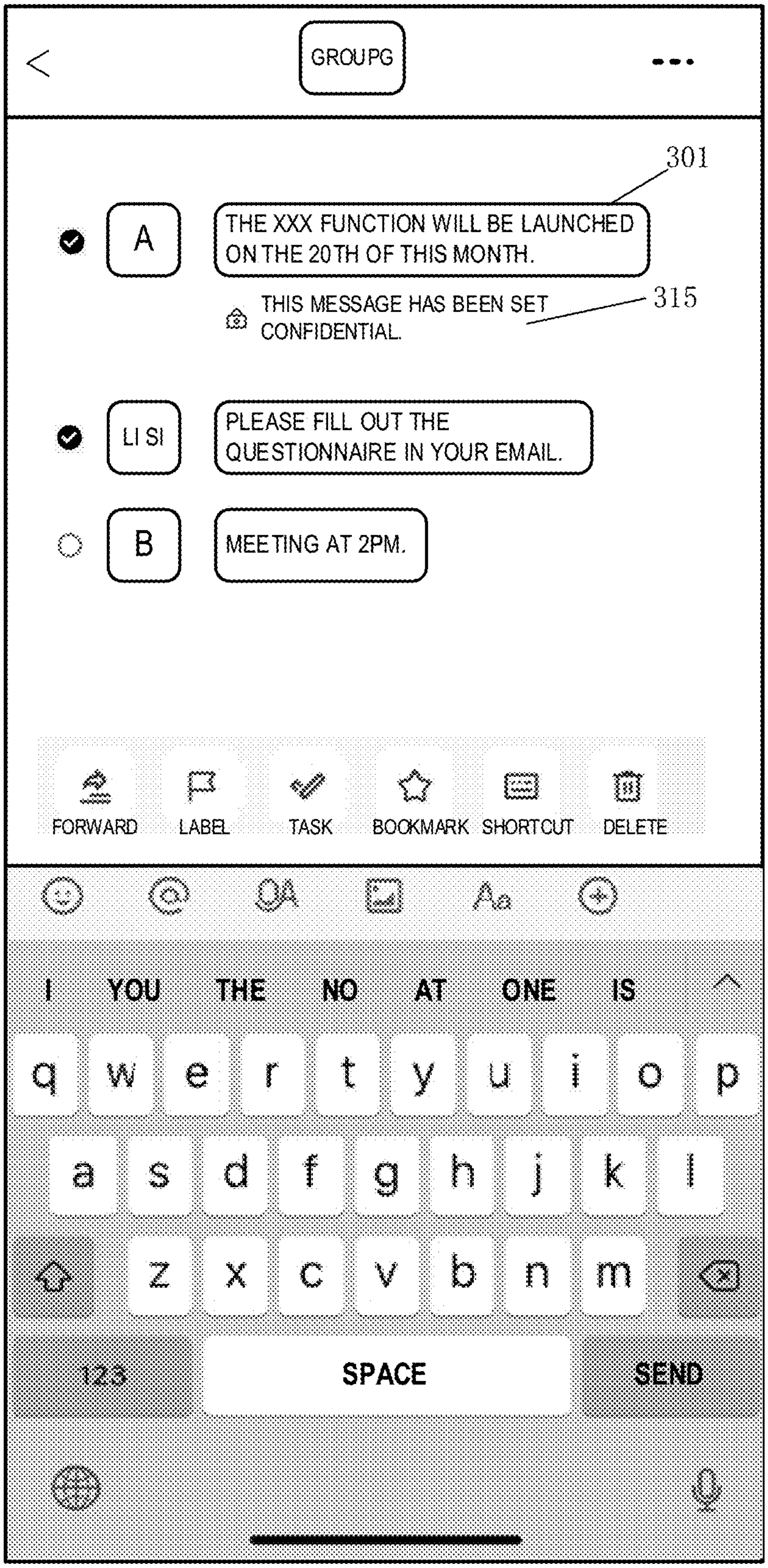
FIG. 3f1

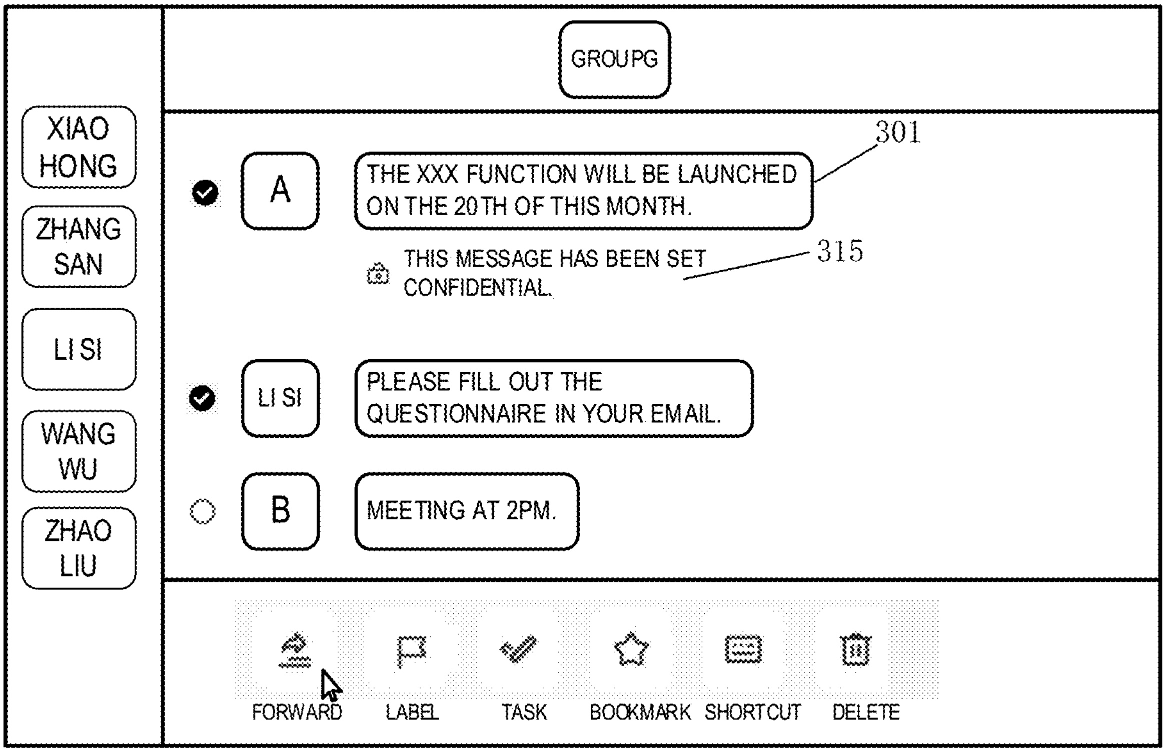
FIG. 3f2

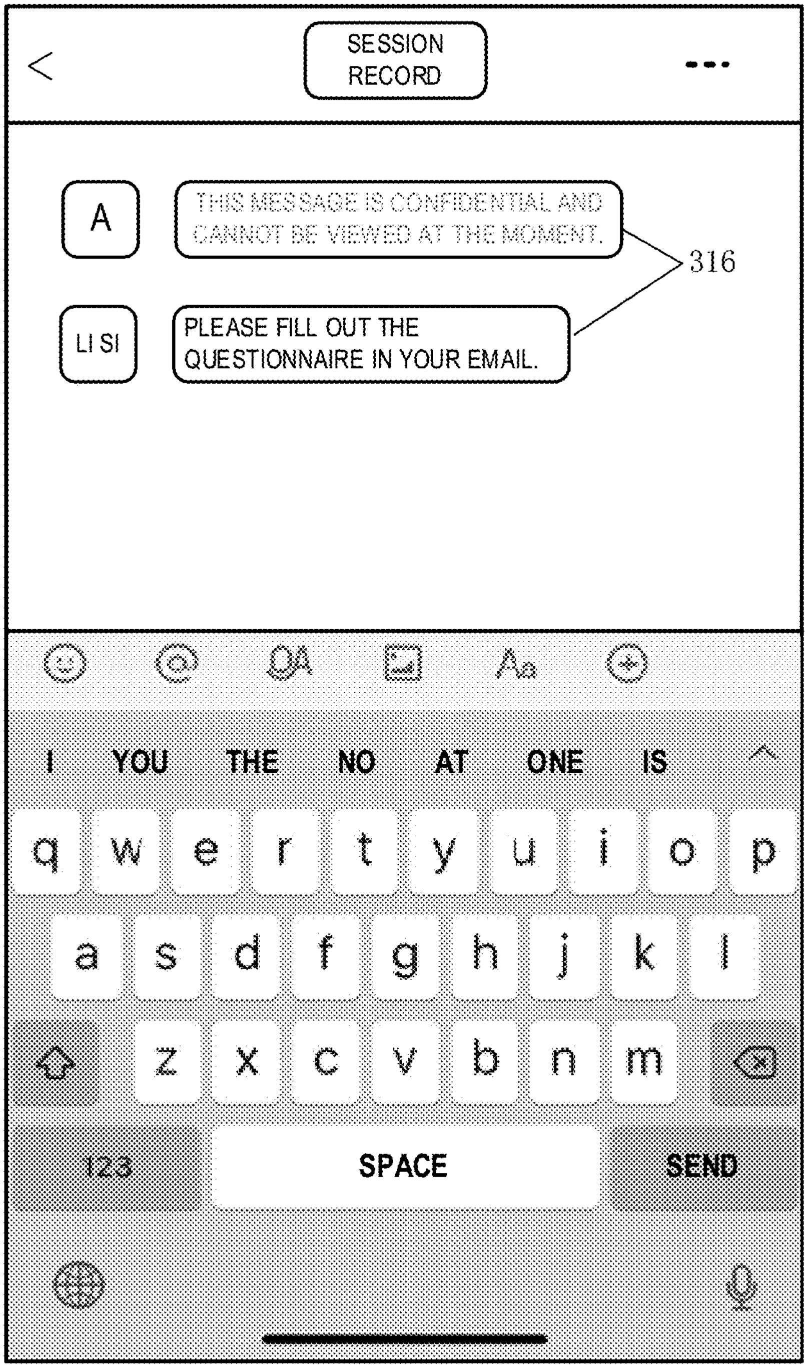
FIG. 3g1

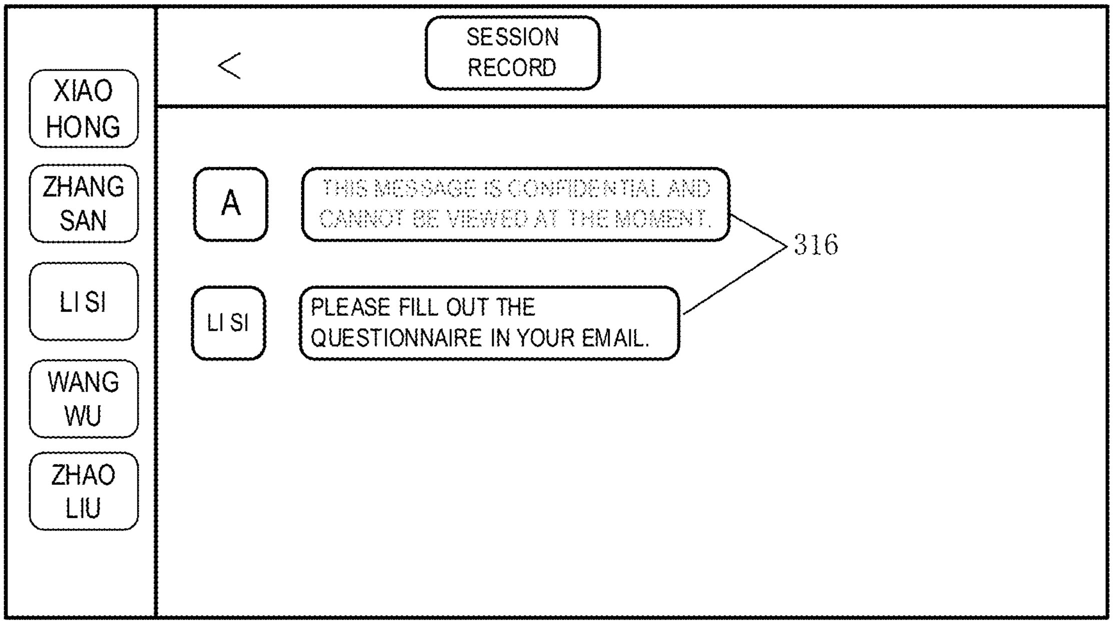
FIG. 3g2

METHOD, APPARATUS AND ELECTRONIC DEVICE FOR INFORMATION PROCESSING FOR CHANGING OPERATION PERMISSIONS IN MESSAGING SESSIONS

CROSS-REFERENCE

This application claims priority to Chinese Patent Application No. 202310341624.9, filed on Mar. 31, 2023, the entirety of which is incorporated herein by reference.

FIELD

The present disclosure is related to the field of computer technology, and in particular to a method, apparatus and electronic equipment for information processing.

BACKGROUND

With the continuous development of terminal technology and network technology, instant messaging tools are increasingly applied in people's work and life, providing many conveniences for people's work and life. Especially at work, people can communicate with members of groups through instant messaging tools, discuss work issues, or notify messages, etc. For the convenience of users, instant messaging tools support users to perform some operations on session messages that may increase the risk of important messages flowing and forwarding to the outside.

SUMMARY

The present disclosure provides a method, apparatus and electronic device for information processing.

According to a first aspect, a method of information processing is provided, and the method includes:

- receiving a first setting operation performed by a first user on a first session message in a target session, wherein the first user is a member of the target session, and the first session message comprises one or more session messages in the target session; and
- in response to the first setting operation, changing a first operation permission of at least part of members of the target session on the first session message to a second operation permission;
- wherein a permission scope of the second operation permission is less than a permission scope of the first operation permission.

According to a second aspect, an apparatus for information processing is provided, and the apparatus includes:

- a receiving module configured to receive a first setting operation performed by a first user on a first session message in a target session, wherein the first user is a member of the target session, and the first session message comprises one or more session messages in the target session; and
- a first changing module configured to, in response to the first setting operation, change a first operation permission of at least part of members of the target session on the first session message to a second operation permission;
- wherein a permission scope of the second operation permission is less than a permission scope of the first operation permission.

According to a third aspect, a computer readable storage medium is provided, the storage medium has stored thereon a computer program, when executed by a processor, implementing the method according to any of the above-mentioned first aspects.

According to a fourth aspect, an electronic device is provided, including a memory, a processor, and a computer program stored in the memory and executable on the processor. When the processor executes the program, the method according to any of the first aspects is implemented.

It should be understood that the foregoing general description and the following detailed description are exemplary and explanatory only, and do not limit the present disclosure.

BRIEF DESCRIPTION OF THE DRAWINGS

In order to more clearly illustrate technical solutions of the embodiments in this specification, the drawings required for the description of the embodiments will be briefly introduced below. Apparently, the drawings in the following description are only some of the embodiments recorded in this specification. For those of ordinary skill in the art, other drawings may be obtained based on these drawings without exerting any creative effort.

Figure 1:
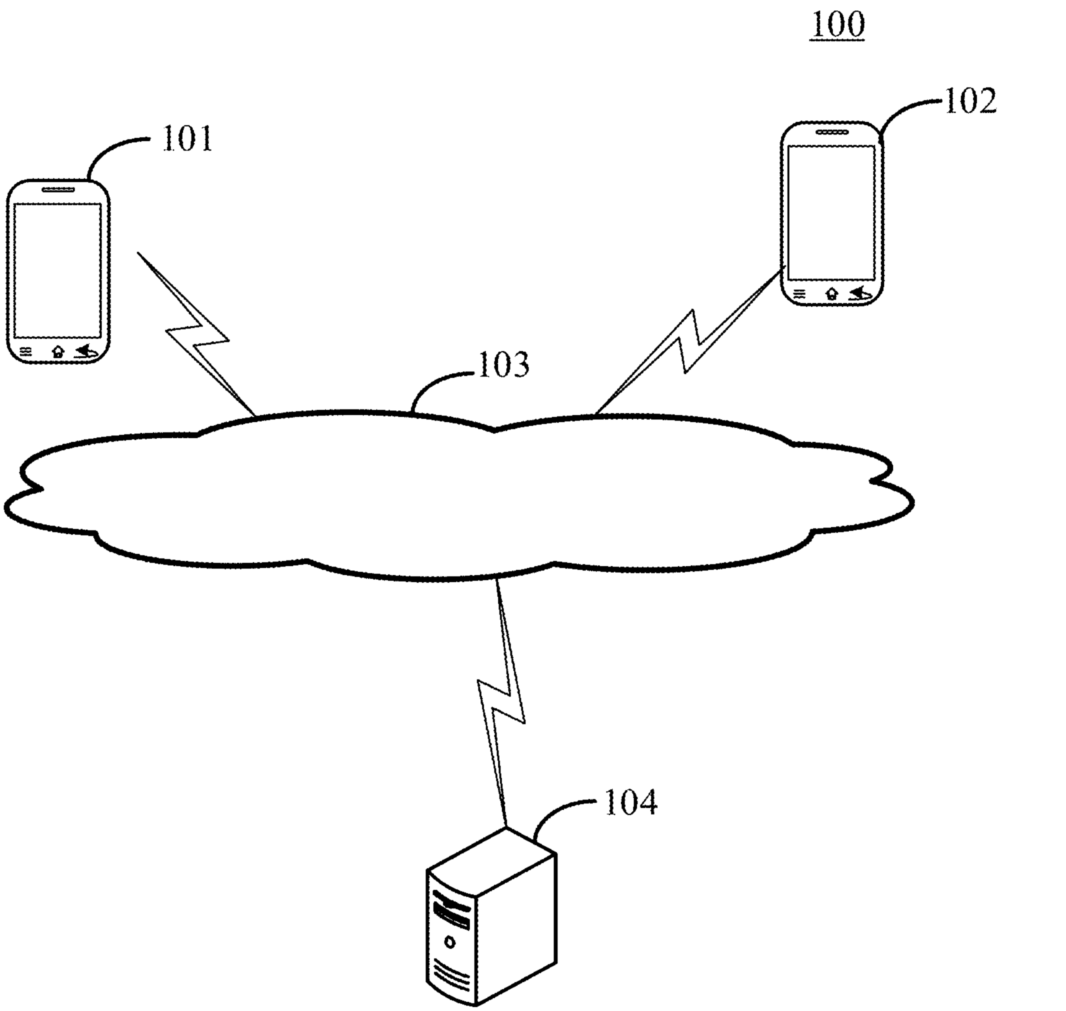
FIG. 1 is a schematic diagram of an exemplary system architecture applying the embodiments of the present disclosure.
Figure 2:
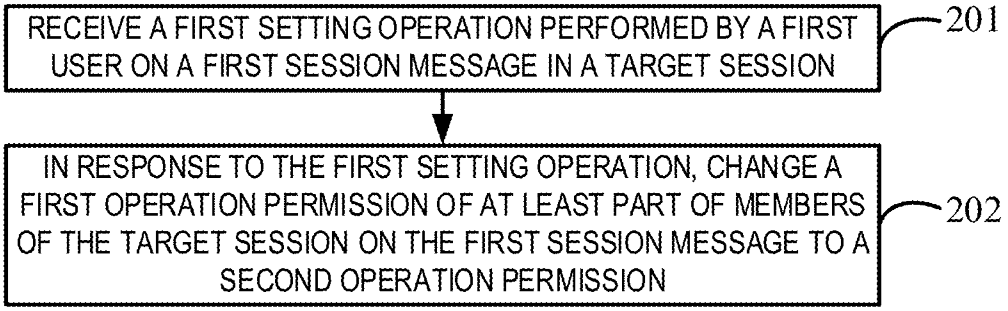
FIG. 2 is a flow chart of a method of information processing according to an exemplary embodiment of the present disclosure.
Figure 4:
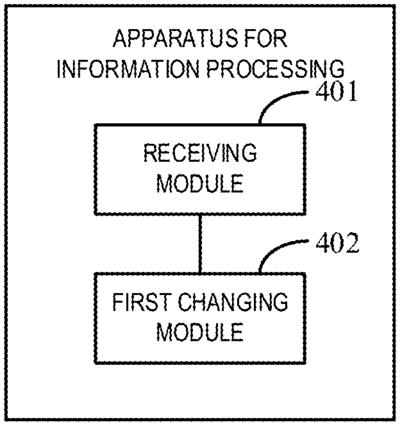
Figure 5:
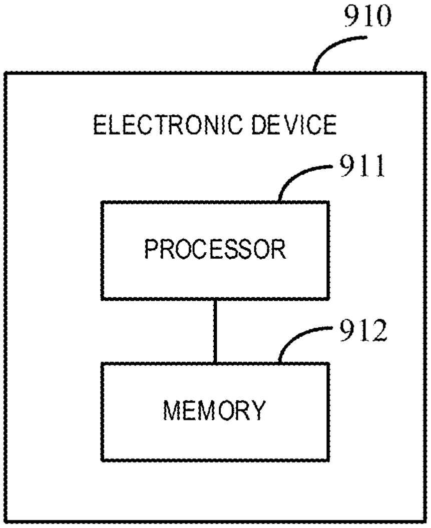
Figure 6:
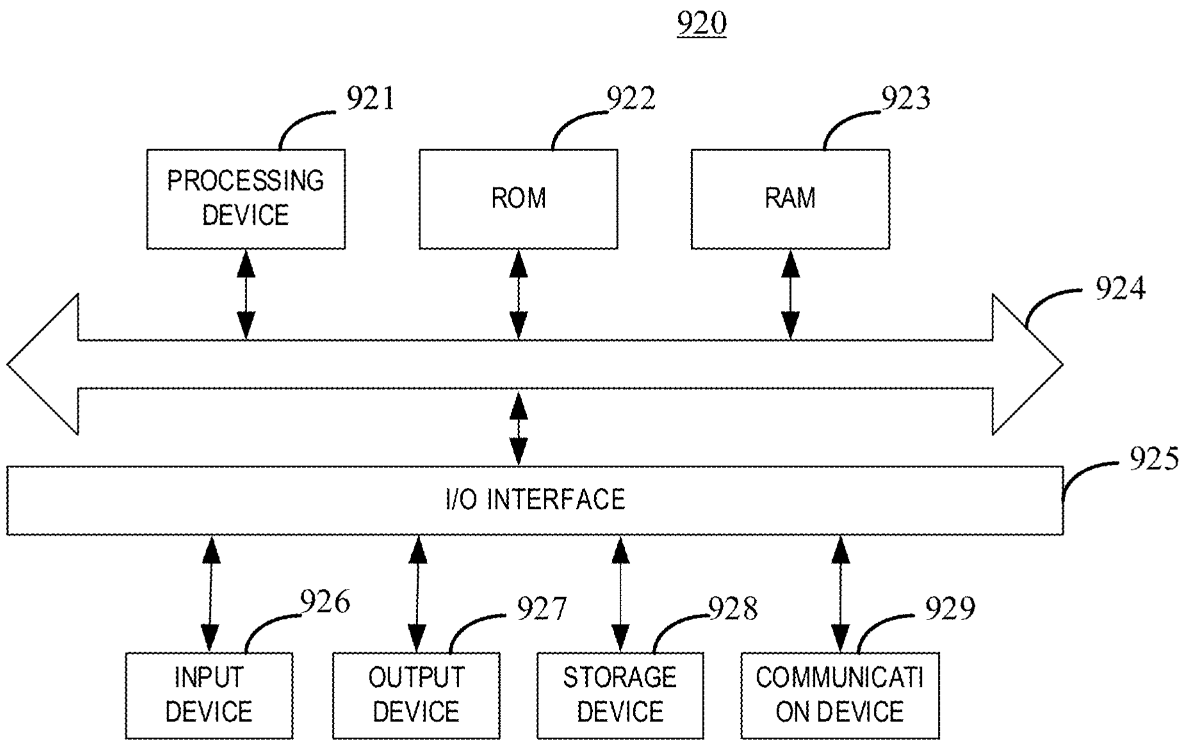
Figure 7:
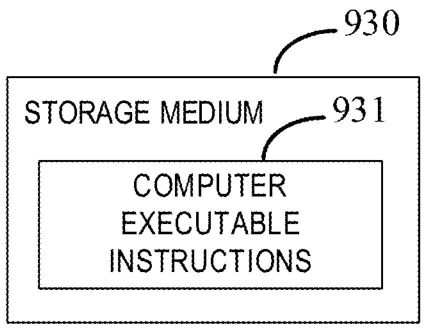

FIG. **3*a*1** is a schematic diagram of a session interface of an instant messaging client according to an exemplary embodiment of the present disclosure;

FIG. **3*a*2** is a schematic diagram of another session interface of an instant messaging client according to an exemplary embodiment of the present disclosure;

FIG. **3*b*1** is a schematic diagram of another session interface of an instant messaging client according to an exemplary embodiment of the present disclosure;

FIG. **3*b*2** is a schematic diagram of another session interface of an instant messaging client according to an exemplary embodiment of the present disclosure;

FIG. **3*c*1** is a schematic diagram of another session interface of an instant messaging client according to an exemplary embodiment of the present disclosure;

FIG. **3*c*2** is a schematic diagram of another session interface of an instant messaging client according to an exemplary embodiment of the present disclosure;

FIG. **3*d*1** is a schematic diagram of another session interface of an instant messaging client according to an exemplary embodiment of the present disclosure;

FIG. **3*d*2** is a schematic diagram of another session interface of an instant messaging client according to an exemplary embodiment of the present disclosure;

FIG. **3*e*1** is a schematic diagram of another session interface of an instant messaging client according to an exemplary embodiment of the present disclosure;

FIG. **3*e*2** is a schematic diagram of another session interface of an instant messaging client according to an exemplary embodiment of the present disclosure;

FIG. **3*f*1** is a schematic diagram of another session interface of an instant messaging client according to an exemplary embodiment of the present disclosure;

FIG. **3*f*2** is a schematic diagram of another session interface of an instant messaging client according to an exemplary embodiment of the present disclosure;

FIG. 3g1 is a schematic diagram of another session interface of an instant messaging client according to an exemplary embodiment of the present disclosure;

FIG. 3g2 is a schematic diagram of another session interface of an instant messaging client according to an exemplary embodiment of the present disclosure;

FIG. 4 is a block diagram of an apparatus for information processing according to an exemplary embodiment of the present disclosure;

FIG. 5 is a schematic block diagram of an electronic device provided by some embodiments of the present disclosure;

FIG. 6 is a schematic block diagram of another electronic device provided by some embodiments of the present disclosure; and FIG. 7 is a schematic diagram of a storage medium provided by some embodiments of the present disclosure.

DETAILED DESCRIPTION

In order to enable those skilled in the art to better understand technical solutions in this specification, the technical solutions in the embodiments in this specification will be clearly and completely described below in conjunction with the accompanying drawings in the embodiments of this specification. Apparently, the described embodiments are only a partial embodiment of this specification, not the entire embodiment. Based on the embodiments in this specification, all other embodiments obtained by those of ordinary skill in the art without creative effort should fall within the scope of protection in this specification.

When the following description relates to the drawings, the same numberal in different drawings refer to the same or similar elements, unless otherwise indicated. The implementations described in the following exemplary embodiments do not represent all implementations consistent with the present disclosure. On the contrary, they are merely examples of an apparatus and method consistent with some aspects of the present disclosure as detailed in the appended claims.

The terms used in the present disclosure are for the purpose of describing particular embodiments only and are not intended to be limiting of the present disclosure. As used in the present disclosure, the singular forms "a", "the" and "said" are intended to include the plural forms as well, unless the context clearly indicated other meanings. It should also be understood that the term "and/or" as used herein refers to and includes any or all possible combinations of one or more of the associated listed items.

It should be understood that although the terms "first", "second", "third", etc. may be used in the present disclosure to describe various information, the information should not be limited to these terms. These terms are only used to distinguish information of the same type from each other. For example, without departing from the scope of the present disclosure, first information may also be referred to as second information, and similarly, the second information may also be referred to as the first information. Depending on the context, the word "if" as used herein may be interpreted as "when" or "as" or "in response to determining".

Refer to FIG. 1, which is a schematic diagram of an exemplary system architecture applying the embodiments of the present disclosure.

As shown in FIG. 1, the system architecture 100 may include a terminal device 101, a terminal device 102, a network 103 and a server 104. It should be understood that the number or types of terminal devices, networks and servers in FIG. 1 are only illustrative. Depending on implementation needs, there may be any number or type of terminal devices, networks, and servers.

The network 103 is a medium used to provide communication links between terminal devices and servers. The network 103 may include various connection types, such as wired and wireless communication links, optical fibers, cables, and more.

The terminal devices 101 and 102 may interact with the server through the network 103 to receive or send requests or information, etc. The terminal devices 101 and 102 may be various electronic devices, including but not limited to a smartphone, a tablet computer, a smart wearable device, a personal digital assistant, and so on.

The server 104 may store, analyze and process the received data, and may also send control commands or requests to the terminal device or other servers. The server may provide services in response to users' service requests. It should be understood that one server may provide one or more services, and the same service may also be provided by multiple 4servers.

Based on the system architecture shown in FIG. 1, in the embodiments of the present disclosure, after the terminal device 101 or the terminal device 102 receives a first setting operation performed by a user on a session message in a target session, a request for permission setting of the session message may be sent to the server 104 through the network 103. After the server 104 receives the above request, it may instruct terminal devices corresponding to at least part of session members in the target session to change the operation permission of the session message in the target session, so that the at least part of members of the target session preform operations on the session message according to the changed operation permission.

The present disclosure will be described in detail below with reference to specific embodiments.

FIG. 2 is a flowchart illustrating a method of information processing according to an exemplary embodiment. The execution actor of this method may be implemented as any terminal device, platform, server or device cluster with computing and processing capabilities. The method includes the following steps.

As shown in FIG. 2, at step 201, a first setting operation performed by a first user on a first session message in a target session is received.

In this embodiment, the target session may be a window for transmitting messages between users in an instant messaging client. The target session may be a single chat session between two users, or it may be a group session between multiple users. After logging in to the instant messaging client, the user may send messages to session members in the target session. The first user is a member of the target session. The first user may be an administrator or a group owner of the target session, or any ordinary member of the target session. It should be understood that this embodiment is not limited to a specific identity of the first user in the first session.

The first session message may be any type of message sent in the target session. For example, the first session message may be a message of a text type, an image type, a video type, or a voice type, or a file type and the like. It should be understood that this embodiment does not limit the specific type of the first session message.

The first setting operation may be a setting operation performed on an operation permission of the first session message. For example, a predetermined triggering operation may be performed on the first session message (such as an operation of clicking on the first session message, or an operation of hovering the mouse pointer over the first session message, or an operation of checking the first session message, etc.), so that an interface of the target session outputs an operation item for setting operation permission. An operation triggered by the user for this operation item may be considered as the first setting operation.

At step 202, in response to the first setting operation, a first operation permission of at least part of members of the target session on the first session message is changed to a second operation permission.

In this embodiment, the at least part of members may be members other than the group owner and administrator in the target session, or at least one member specified by the group owner or administrator of the target session, or any member in the target session with a predetermined level, or all members of the target session, etc. This embodiment does not limit the specific identity of the at least part of the members.

In this embodiment, a permission scope of the second operation permission is less than a permission scope of the first operation permission, that is, the operations allowed in the permission scope of the second operation permission are less than the operations allowed in the permission scope of the first operation permission. For example, within the permission scope of the first operation permission, an operation A, an operation B, an operation C and an operation D may be allowed on the first session message. Within the permission scope of the second operation permission, only the operation A and the operation B are allowed on the first session message.

The method of information processing provided by the present disclosure, in response to the first setting operation being triggered by the user on the first session message in the target session, changes the first operation permission of at least part of the members of the target session on the first session message to the second operation permission with the smaller permission scope, thus restricting the partial operation permission of the members of the target session on the first session message, thereby reducing the risk of important messages in the target session flowing and forwarding to the outside, and improving the security of information interaction among session members.

It should be noted that the first session message may include one or more session messages in the target session. Specifically, in one implementation, the first user may perform the first setting operation on a session message in the target session. As shown in FIG. 3*a*1 and FIG. 3*a*2 (FIG. 3*a*1 corresponds to a mobile interface, FIG. 3*a*2 corresponds to a PC interface), a user A who is a member of session GROUPG (that is, the name of a group chat is GROUPG) may perform a triggering operation on a session message 301. For example, the user A may long press the session message 301, or hover the mouse pointer over the session message 301, etc. Thus, an alternative menu bar 302 is displayed on a session interface in the session GROUPG. The alternative menu bar 302 includes a control 303. The user A may perform the first setting operation on the session message 301 through the triggering control 30 to reduce the permission scope of the operation permission by the at least part of the members on the session message 301 in the session GROUPG.

In another implementation, the first user may perform the first setting operation on a plurality of session messages in the target session. As shown in FIG. 3*b*1 and FIG. 3*b*2 (FIG. 3*b*1 corresponds to a mobile interface, FIG. 3*b*2 corresponds to a PC interface), the user A of the members of session GROUPG may select a session message 304 and a session message 305 by triggering a multi-select control. An alternative menu bar 306 is displayed on the session interface in the session GROUPG. The alternative menu bar 306 includes a control 307. The user A may perform the first setting operation on the session message 304 and the session message 305 by triggering the control 307 to reduce the permission scope of the operation permission of the at least part of members on the session message 304 and the session message 305 in the session GROUPG.

In some embodiments, the first user related to in step 201 may be a sender of the first session message in the target session, or a group owner or an administrator of the target session. For example, the members of the target session include a user m1, a user m2, a user m3, a user m4 . . . , among which the user m1 is the group owner of the target session, the user m2 is the administrator of the target session, and the user m3 and the user m4 are ordinary members of the target session. After the user m3 sends a message x in the target session, the user m3 may perform the first setting operation on the message x. The user m1 and the user m2 may also perform the first setting operation on the message x, while the user m4 cannot perform the first setting operation on the message x.

In other embodiments, if the first user is the group owner or the administrator of the target session, and a sender of the first session message is a session member other than the group owner or the administrator, then at step 202, after changing the first operation permission to the second operation permission, a notification message may be sent to the sender of the first session message to inform the sender that the operation permission of the first session message has been changed.

As shown in FIG. 3*c*1 and FIG. 3*c*2 (FIG. 3*c*1 corresponds to a mobile interface, FIG. 3*c*2 corresponds to a PC interface), the user A of the members of the session GROUPG sent the session message 301, and the administrator B of the session GROUPG performs the first setting operation on the session message 301. After completing the first setting operation, a notification message 308 with a content "B (ADMINISTRATOR) HAS SET A CONFIDENTIAL MESSAGE. CLICK TO VIEW THE MESSAGE" is sent to the user A. The user A may locate the session message 301 by triggering the notification message 308.

After the administrator changes the operation permission on the session message, the sender of the session message is notified, thus improving the user experience.

In some embodiments, an operation related to in step 202 corresponding to the second operation permission exlcudes an operation related to message flowing and forwarding, and operations corresponding to the first operation permission comprise an operation related to message flowing and forwarding. Herein, the operation related to message flowing and forwarding may be an operation that may send the message out of the target session. the operation related to message flowing and forwarding may comprise one or more of: a copy operation; a download operation; an edit operation; or a forwarding operation, etc.

Since the operation corresponding to the second operation permission excludes the operation related to message flowing and forwarding, the risk of messages in the target session being transmitted out of the target session is reduced, which helps to improve the security of information interaction among session members.

In some embodiments, at step 202, changing the first operation permission of at least part of members of the target session on the first session message to the second operation permission comprises: disabling a triggering control corresponding to a first operation by the at least part of members on the first session message, or hiding the triggering control; wherein the first operation is an operation outside a permission scope of the second operation permission. The first operation may be an operation related to message flowing and forwarding. For example, the first operation may include but is not limited to a copy operation, a download operation, an editing operation, a forwarding operation, etc.

As shown in FIG. 3*d*1 and FIG. 3*d*2 (FIG. 3*d*1 corresponds to a mobile interface, FIG. 3*d*2 corresponds to a PC interface), after the user A performs the first setting operation on the session message 301 in the session GROUPG, the at least part of the members in the session GROUPG perform a predetermined operation on the session message 301 (for example, long press the session message 301, or right-click on the session message 301, etc.), an alternative menu bar 309 is displayed on the session interface in the session GROUPG. The alternative menu bar 309 includes a control 310 for copying a message and a control 311 for forwarding a message and a control 320 for editing a message. However, the controls 310, 311, and 320 are disabled, and the users cannot copy the message by triggering the control 310, forward the message by triggering the control 311, or editing the message by triggering the control 320. It should be noted that the controls for copying the message, forwarding the message, and editing the message may also be directly hidden in the alternative menu bar. The controls for copying the message, forwarding the message, and editing the message are not visible (not shown in the figure).

In some embodiments, the first session message related to in step 201 comprises a message of a file type, and an operation corresponding to the second operation permission related to in step 202 excludes one or more of: opening, with a third-party application, a corresponding file in the first session message; or saving a file corresponding to the first session message in a cloud.

Specifically, the session message may be any type of message. If the session message is a message of a file type, on the one hand, the user may open a file in the session message through a third-party application. In the third-party application, files in session messages may be performed operations on such as a download, edit, forwarding, copy and the like. However, the instant messaging client cannot restrict the operation on the file in a third-party application. Therefore, if the first session message includes a message of a file type, the operation corresponding to the second operation permission may exclude opening the corresponding file in the first session message with a third-party application. This prevents users from first opening the corresponding file in the first session message with a third-party application, and then downloading, editing, forwarding, copying, and performing other operations. This may reduce the risk of files being transferred outside the target session and further improved the security of information interaction among session members.

On the other hand, the files corresponding to the session messages may be stored in a cloud, and users may download, edit, forward, copy and perform other operations on the files stored in the cloud. The instant messaging client cannot restrict operations on files stored in the cloud. Therefore, if the first session message includes a message of a file type, the operation corresponding to the second operation permission may exclude storing the file corresponding to the first session message in the cloud. This prevents users from storing the file corresponding to the first session message in the cloud, and then downloading, editing, forwarding, copying, and performing other operations. This may reduce the risk of files being transferred outside the target session and further improved the security of information interaction among session members.

In some embodiments, if the first session message related to in step 201 includes one or more messages in a first string of messages, then at step 202, in response to the first setting operation, the first operation permission of at least part of members of the target session on all messages in the first string of messages is changed to the second operation permission. Herein, the first string of messages may be messages in the form of a topic, and the first string of messages may include a main topic message and a comment message in reply to the main topic message. The first session message may be a main topic message or a comment message in reply to the main topic message. If the first setting operation is performed on one or more messages in the topic form, the first operation permission on the entire topic form messages (including the main topic message and all comment messages) is directly changed to the second operation permission.

As shown in FIG. 3*e*1 and FIG. 3*e*2 (FIG. 3*e*1 corresponds to a mobile interface, FIG. 3*e*2 corresponds to a PC interface), a session message 312 in the session GROUPG is a string of messages in the form of a topic, where a message 313 is a main topic message, and a message 314 is a comment message in reply to the main topic message. The user A of the members in the session GROUPG may perform the first setting operation on the main topic message or comment messages in the session message 312. After the first setting operation is completed, the first operation permission corresponding to the entire session message 312 may be directly changed to the second operation permission.

By taking the main topic message and comment messages in the form of a topic message as a whole to change the operation permissions, it is possible to prevent part of the message content from being flowed and forwarded outside the main topic message or some comment messages in the topic message, enhancing the security of information interaction among session members.

In some embodiments, after changing the first operation permission to the second operation permission at step 202, the members of the target session may also perform a second setting operation on the first session message. In response to the second setting operation, the second operation permission of the at least part of members on the first session message may be changed to the first operation permission. It should be noted that an interface and process for performing the second setting operation may be similar to the interface and process for performing the first setting operation, and the interface and process for the second setting operation will not be described again here. It should be noted that after changing the second operation permission by the at least part of the members in the target session on the first session message to the first operation permission, a notification message may further be sent to the sender of the first session message.

In other embodiments, the second setting operation may be performed by a second user, who may be a different user from the first user, and the second user may be the group owner or the administrator of the target session. The second user may also be the same user as the first user. For example, the members of the target session include a user m1, a user m2, a user m3, a user m4 . . . , among which the user m1 is the group owner of the target session, the user m2 is the administrator of the target session, and the user m3 and the user m4 are ordinary members of the target session. After the user m3 sends a message x in the target session and performs the first setting operation on the message x, the user m3 may perform the second setting operation on the message x. The user m1 and the user m2 may also perform the second setting operation on the message x, while the user m4 cannot perform the second setting operation on the message x.

In other embodiments, if the first user is the group owner or the administrator of the target session, and the sender of the first session message is a session member other than the group owner or the administrator, after changing the first operation permission to the second operation permission, the sender of the first session message is prevented from changing the second operation permission of the at least part of members on the first session message.

For example, the members of the target session include a user n1, a user n2, a user n3, . . . , among which the user n1 is the group owner of the target session, the user n2 is the administrator of the target session, and the user n3 is the ordinary member of the target session. After the user n3 sends a message y in the target session and the user n1 performs the first setting operation on the message y, both the user n1 and the user n2 may perform the second setting operation on the message y, while the user n3 cannot perform the second setting operation on the message y.

Since in this embodiment, after the administrator or the group owner of the target session changes the operation permission on the session message, the sender of the session message cannot cancel the operation of changing the operation permission. Therefore, it is possible to prevent the session message that has been restricted from operation permission from being unrestricted, causing information interaction among session members more secure.

In some embodiments, after changing the first operation permission of at least part of the members of the target session on the first session message to the second operation permission, in response to the first session message being selected by a third user as a message for batch processing and the batch processing being performed, prompt information for prompting the second operation permission of the first session message is displayed in a session interface. The third user may be a user of the at least part of members.

Specifically, any member of the at least part of members in the target session may select any number of session messages for batch processing. If the selected multiple session messages include the first session message with the operation permission changed to the second operation permission, prompt information may be displayed in the session interface for the first session message.

For example, as shown in FIG. **3*f*1 and FIG. 3*f*2 (FIG. 3*f*1 corresponds to a mobile interface, FIG. 3*f*2 corresponds to a PC interface), after performing the first setting operation on the session message 301 in the session GROUPG, at least part of members, a user C, in the session GROUPG may select multiple session messages, and multiple session messages may include the session message 301. After the user C selects the session message 301, a prompt message 315 with the content "THE MESSAGE HAS BEEN SET CONFIDENTIAL" may be displayed below the session message 301** on the session interface in the session GROUPG.

In some embodiments, after changing the first operation permission of at least part of the members of the target session on the first session message to the second operation permission, in response to the first session message being selected by a third user as a message for batch processing and the batch processing being performed, a content corresponding to the first session message is hidden in a result of the batch processing, and the third user is a user of the at least part of members.

Specifically, when any member of the at least part of the target session selects any multiple session messages for batch processing, if the selected multiple session messages include the first operation permission with the operation permission changed to the second operation permission, after batch processing, if the batch processing is a processing operation other than the second operation permission (for example, copying, forwarding, downloading, etc.), then the content corresponding to the first session message may be hidden in the result of batch processing.

For example, as shown in FIG. **3*g*1 and FIG. 3*g*2 (FIG. 3*g*1 corresponds to a mobile interface, FIG. 3*g*2 corresponds to a PC interface), after performing the first setting operation on the session message 301 in the session GROUPG, at least part of members, a user C, in the session GROUPG may select multiple session messages, and the multiple session messages may include the session message 301. After the user C selects the multiple session messages and forwards them, the content of the session message 301 will not be displayed in a forwarded message 316** (that is, the forwarded result).

Corresponding to the embodiments of the aforementioned method of information processing, the present disclosure further provides embodiments of an apparatus for information processing.

As shown in FIG. 4, which is a block diagram of an apparatus for information processing shown according to an exemplary embodiment of the present disclosure. The apparatus may include: a receiving module 401 and a first changing module 402.

Herein, the receiving module 401 is configured to receive a first setting operation performed by a first user on a first session message in a target session, wherein the first user is a member of the target session, and the first session message comprises one or more session messages in the target session.

The first changing module 402 is configured to, in response to the first setting operation, change a first operation permission of at least part of members of the target session on the first session message to a second operation permission. Herein, a permission scope of the second operation permission is less than a permission scope of the first operation permission.

In some implementations, the first user is a sender of the first session message; or the first user is a group owner or an administrator of the target session.

In other implementations, operations corresponding to the second operation permission exclude an operation related to message flowing and forwarding, and operations corresponding to the first operation permission comprise an operation related to message flowing and forwarding.

In other implementations, the first session message comprises one or more messages in a first string of messages, the first changing module 402 is configured to: change the first operation permission of at least part of members of the target session on all messages in the first string of messages to the second operation permission.

In other implementations, the apparatus may further includes: a second changing module (not shown in the figure).

Herein, the second change module is configured to after changing the first operation permission to the second operation permission, in response to a second setting operation performed on the first session message in the target session, change the second operation permission of the at least part of members on the first session message to the first operation permission.

In other implementations, the second setting operation is performed by a second user. The second user and the first user are the same user; or the second user and the first user are different users, and the second user is a group owner or an administrator of the target session.

In other implementations, the first user is the group owner or the administrator of the target session, a sender of the first session message is a session member other than the group owner or the administrator, and after changing the first operation permission to the second operation permission, the sender of the first session message is prevented from changing the second operation permission of the at least part of members on the first session message.

In other implementations, the apparatus may further includes: a notification module (not shown in the figure).

Herein, the first user is the group owner or the administrator of the target session and a sender of the first session message is a session member other than the group owner or the administrator, the notification module is configured to, after changing the first operation permission of the at least part of members of the target session on the first session message to the second operation permission, send a notification message to the sender of the first session message.

In other implementations, the first changing module 402 is configured to: disable a triggering control corresponding to a first operation by the at least part of members on the first session message, or hide the triggering control; wherein the first operation is an operation outside a premission scope of the second operation permission.

In other implementations, the apparatus may further include: a hiding module (not shown in the figure).

Herein, the hiding module is configured to, after changing the first operation permission of at least part of members of the target session on the first session message to the second operation permission, in response to the first session message being selected by a third user as a message for batch processing and the batch processing being performed, hide a content corresponding to the first session message in a result of the batch processing. Herein, the third user is a user of the at least part of members.

In other implementations, the apparatus may further include: a prompting module (not shown in the figure).

Herein, the prompting module is configured to, after changing the first operation permission of at least part of members of the target session on the first session message to the second operation permission and after the first session message is selected by a third user as a message for batch processing, display prompt information for prompting the second operation permission of the first session message in a session interface. Herein, the third user is a user of the at least part of members.

In other implementations, the first session message comprises a message of a file type, and an operation corresponding to the second operation permission excludes one or more of: opening, with a third-party application, a corresponding file in the first session message; or saving a file corresponding to the first session message in a cloud.

In other implementations, the operation related to message flowing and forwarding comprises one or more of: a copy operation; a download operation; an edit operation; or a forwarding operation.

As for embodiments of the apparatus, since they basically correspond to the embodiments of the method, please refer to the partial description of the embodiments of the method for relevant details. The above-described embodiments of the apparatus are only illustrative. The units described as separate components may or may not be physically separated. The components shown as units may or may not be physical units, that is, they may be located in one place, or they may be distributed to multiple network units. Some or all of the modules may be selected according to actual needs to achieve the purpose of the embodiments of the present disclosure. Those of ordinary skill in the art may understand and implement the method without any creative effort.

FIG. 5 is a schematic block diagram of an electronic device provided by some embodiments of the present disclosure. As shown in FIG. 5, the electronic device 910 includes a processor 911 and a memory 912, which may be used to implement a client or a server. The memory 912 is used to store non-transitory computer-executable instructions (e.g., one or more computer program modules). The processor 911 is used to run the computer-executable instructions, when run by the processor 911, performing one or more steps in the method of information processing described above, thereby realizing the method of information processing described above. The memory 912 and processor 911 may be interconnected by a bus system and/or other forms of connection mechanisms (not shown).

For example, the processor 911 may be a central processing unit (CPU), a graphics processing unit (GPU), or other forms of processing units with data processing capabilities and/or program execution capabilities. For example, the central processing unit (CPU) may be of X86 or ARM architecture. The processor 911 may be a general-purpose processor or a special-purpose processor and may control other components in the electronic device 910 to perform desired functions.

For example, the memory 912 may include any combination of one or more computer program products, which may include various forms of computer readable storage medium, such as volatile memory and/or non-volatile memory. The volatile memory may include, for example, random access memory (RAM) and/or cache memory (cache), etc. The non-volatile memory may include, for example, read-only memory (ROM), hard disk, erasable programmable read-only memory (EPROM), portable compact disk read-only memory (CD-ROM), USB memory, flash memory, and the like. One or more computer program modules may be stored on a computer readable storage medium, and the processor 911 may run one or more computer program modules to implement various functions of the electronic device 910. Various application programs and various data, as well as various data used and/or generated by the application programs, etc. may also be stored in the computer readable storage medium.

It should be noted that in the embodiments of the present disclosure, the specific functions and technical effects of the electronic device 910 may be referred to the above description of the method of information processing, which will not be described again here.

FIG. 6 is a schematic block diagram of another electronic device provided by some embodiments of the present disclosure. The electronic device 920 is, for example, suitable for implementing the method of information processing provided by the embodiments of the present disclosure. The electronic device 920 may be a terminal device or the like, and may be used to implement a client or a server. The electronic device 920 may include, but is not limited to, a mobile phone, a notebook computer, a digital broadcast receiver, a personal digital assistant (PDA), a tablet computer (PAD), a portable multimedia player (PMP), a vehicle-mounted terminal (such as a vehicle-mounted navigation terminal), a mobile terminal such as a wearable electronic device and a fixed terminal such as a digital TV, a desktop computer, a smart home device, etc. It should be noted that the electronic device 920 shown in FIG. 6 is only an example, and it does not bring any limitations to the functions and usage scope of the embodiments of the present disclosure.

As shown in FIG. 6, the electronic device 920 may include a processing device (e.g., a central processing unit, a graphics processor, etc.) 921, which may be loaded into a random access memory (RAM) 923 according to a program stored in a read-only memory (ROM) 922 or from a storage device 928 to perform various appropriate actions and processes. In the RAM 923, various programs and data required for operations of the electronic device 920 are also stored. The processing device 921, the ROM 922, and the RAM 923 are connected to each other through a bus 924. An input/output (I/O) interface 925 is also connected to the bus 924.

Typically, the following device may be connected to the I/O interface 925: an input device 926 including, for example, a touch screen, a touch pad, a keyboard, a mouse, a camera, a microphone, an accelerometer, a gyroscope, etc.; an output device 927 including, for example, a liquid crystal display (LCD), a speaker, a vibrator, etc.; a storage device 928 including, for example, a tape, a hard drive, etc.; and a communication device 929. The communication device 929 may allow the electronic device 920 to communicate wirelessly or wiredly with other electronic devices to exchange data. Although FIG. 6 illustrates the electronic device 920 having various device, it should be understood that it is not required to implement or have all of the illustrated device and that the electronic device 920 may alternatively implement or have more or fewer device.

For example, according to the embodiments of the present disclosure, the above-mentioned method of information processing may be implemented as a computer software program. For example, the embodiments of the present disclosure include a computer program product, which includes a computer program carried on a non-transitory computer readable medium. The computer program includes program code for performing the above method of information processing. In such embodiments, the computer program may be downloaded and installed from the network via the communication device 929, or from the storage device 928, or from the ROM 922. When the computer program is executed by the processing device 921, the functions defined in the method of information processing provided by the embodiments of the present disclosure may be realized.

FIG. 7 is a schematic diagram of a storage medium provided by some embodiments of the present disclosure. For example, as shown in FIG. 7, a storage medium 930 may be a non-transitory computer readable storage medium for storing non-transitory computer-executable instructions 931. When the non-transitory computer-executable instructions 931 are executed by a processor, the method of information processing described in the embodiments of the present disclosure may be implemented. For example, when the non-transitory computer-executable instructions 931 are executed by the processor, One or more steps in the method of information processing described above may be performed.

For example, the storage medium 930 may be applied in the above-mentioned electronic device. For example, the storage medium 930 may include a memory in the electronic device.

For example, the storage medium may include a memory card of a smartphone, a storage component of a tablet computer, a hard drive of a personal computer, a random access memory (RAM), a read only memory (ROM), an erasable programmable read only memory (EPROM), a portable compact disk read-only memory (CD-ROM), a flash memory, or any combination of the above storage medium may also be other suitable storage medium.

For example, the description of the storage medium 930 may refer to the description of the memory in the embodiments of the electronic device, and repeated descriptions will not be repeated. For the specific functions and technical effects of the storage medium 930, please refer to the above description of the method of information processing, which will not be described again here.

It should be noted that in the context of the present disclosure, a computer readable medium may be a tangible medium that may contain or store a program for use by or in conjunction with an instruction execution system, apparatus, or device. The computer readable medium may be a computer readable signal medium or a computer readable storage medium or any combination of the two. The computer readable storage medium may be, for example, but is not limited to: an electrical, magnetic, optical, electromagnetic, infrared, or semiconductor system, apparatus, or device, or any combination thereof. More specific examples of computer readable storage medium may include, but are not limited to: an electrical connection having one or more wires, a portable computer disk, a hard drive, a random access memory (RAM), a read only memory (ROM), an erasable programmed read-only memory (EPROM or flash memory), fiber optics, a portable compact disk read-only memory (CD-ROM), an optical storage device, an magnetic storage device, or any suitable combination of the above. In the present disclosure, a computer readable storage medium may be any tangible medium that contains or stores a program for use by or in connection with an instruction execution system, apparatus, or device. In the present disclosure, a computer readable signal medium may include a data signal propagated in a baseband or as part of a carrier wave, carrying computer readable program code therein. Such propagated data signal may take many forms, including but not limited to electromagnetic signals, optical signals, or any suitable combination of the above. A computer readable signal medium may also be any computer readable medium other than a computer readable storage medium that may send, propagate, or transmit a program for use by or in connection with an instruction execution system, apparatus, or device. Program code embodied on a computer readable medium may be transmitted using any suitable medium, including but not limited to: wire, optical cable, RF (radio frequency), etc., or any suitable combination of the above.

Other embodiments of the disclosure will be readily apparent to those skilled in the art from consideration of the specification and practice of the invention disclosed herein. The present disclosure is intended to cover any variations, uses, or adaptations of the disclosure that follow the general principles of the disclosure and include common knowledge or customary technical means in this field that are not disclosed in the present disclosure. The specification and embodiments are considered to be illustrative only, with the true scope and spirit of the disclosure being indicated by the claims.

It is to be understood that the present disclosure is not limited to the precise structures described above and illustrated in the accompanying drawings, and various modifications and changes may be made without departing from the scope thereof. The scope of the disclosure is limited only by the appended claims.

We claim:

1. A method of information processing, comprising:

receiving a first setting operation performed by a first user on a first session message in a target session, wherein the first user is a member of the target session, and the first session message comprises one or more session messages in the target session; and in response to the first setting operation, changing a first operation permission of at least part of members of the target session on the first session message to a second operation permission;

wherein a permission scope of the second operation permission is less than a permission scope of the first operation permission, wherein changing the first operation permission of at least part of members of the target session on the first session message to the second operation permission comprises: disabling a triggering control corresponding to a first operation by the at least part of members on the first session message, or hiding the triggering control, the first operation being an operation inside a permission scope of the first operation permission and outside a permission scope of the second operation permission, and the first operation being an operation related to message forwarding.

2. The method of claim 1, wherein, the first user is a sender of the first session message; or the first user is a group owner or an administrator of the target session.

3. The method of claim 1, wherein the first session message comprises one or more messages in a first string of messages, and changing a first operation permission of at least part of members of the target session on the first session message to a second operation permission comprises: changing the first operation permission of at least part of members of the target session on all messages in the first string of messages to the second operation permission.

4. The method of claim 1, wherein, after changing the first operation permission to the second operation permission, the method further comprises: in response to a second setting operation performed on the first session message in the target session, changing the second operation permission of the at least part of members on the first session message to the first operation permission.

5. The method of claim 4, wherein the second setting operation is performed by a second user;

the second user and the first user are the same user; or the second user and the first user are different users, and the second user is a group owner or an administrator of the target session.

6. The method of claim 1, wherein the first user is a group owner or an administrator of the target session, a sender of the first session message is a session member other than the group owner or the administrator, and after changing the first operation permission to the second operation permission, the sender of the first session message is prevented from changing the second operation permission of the at least part of members on the first session message.

7. The method of claim 1, wherein the first user is a group owner or an administrator of the target session and a sender of the first session message is a session member other than the group owner or the administrator, and the method further comprises:

after changing the first operation permission of the at least part of members of the target session on the first session message to the second operation permission, sending a notification message to the sender of the first session message.

8. The method of claim 1, wherein after changing the first operation permission of at least part of members of the target session on the first session message to the second operation permission, the method further comprises:

in response to the first session message being selected by a third user as a message for batch processing and the batch processing being performed, hiding a content corresponding to the first session message in a result of the batch processing;

wherein the third user is a user of the at least part of members.

9. The method of claim 1, wherein after changing the first operation permission of at least part of members of the target session on the first session message to the second operation permission, the method further comprises:

after the first session message is selected by a third user as a message for batch processing, displaying prompt information for prompting the second operation permission of the first session message in a session interface;

wherein the third user is a user of the at least part of members.

10. The method of claim 1, wherein the first session message comprises a message of a file type, and an operation corresponding to the second operation permission excludes one or more of:

opening, with a third-party application, a corresponding file in the first session message; or saving a file corresponding to the first session message in a cloud.

11. The method of claim 1, wherein the operation related to message forwarding comprises one or more of: a copy operation; a download operation; an edit operation; or a forwarding operation.

12. A non-transitory computer readable storage medium having stored thereon a computer program, when executed in a computer, causing the computer to perform actions for information processing, the actions comprising:

receiving a first setting operation performed by a first user on a first session message in a target session, wherein the first user is a member of the target session, and the first session message comprises one or more session messages in the target session; and in response to the first setting operation, changing a first operation permission of at least part of members of the target session on the first session message to a second operation permission;

wherein a permission scope of the second operation permission is less than a permission scope of the first operation permission, wherein changing the first operation permission of at least part of members of the target session on the first session message to the second operation permission comprises: disabling a triggering control corresponding to a first operation by the at least part of members on the first session message, or hiding the triggering control, the first operation being an operation inside a permission scope of the first operation permission and outside a permission scope of the second operation permission, and the first operation being an operation related to message forwarding.

13. An electronic device comprising a memory and a processor, the memory storing executable code and when the processor executes the executable code implementing actions for information processing, the actions comprising:

receiving a first setting operation performed by a first user on a first session message in a target session, wherein the first user is a member of the target session, and the first session message comprises one or more session messages in the target session; and in response to the first setting operation, changing a first operation permission of at least part of members of the target session on the first session message to a second operation permission;

wherein a permission scope of the second operation permission is less than a permission scope of the first operation permission, wherein changing the first operation permission of at least part of members of the target session on the first session message to the second operation permission comprises: disabling a triggering control corresponding to a first operation by the at least part of members on the first session message, or hiding the triggering control, the first operation being an operation inside a permission scope of the first operation permission and outside a permission scope of the second operation permission, and the first operation being an operation related to message forwarding.

14. The device of claim 13, wherein the first session message comprises one or more messages in a first string of messages, and changing a first operation permission of at least part of members of the target session on the first session message to a second operation permission comprises: changing the first operation permission of at least part of members of the target session on all messages in the first string of messages to the second operation permission.

15. The device of claim 13, wherein, after changing the first operation permission to the second operation permission, the actions further comprise: in response to a second setting operation performed on the first session message in the target session, changing the second operation permission of the at least part of members on the first session message to the first operation permission.

16. The device of claim 13, wherein the first user is a group owner or an administrator of the target session, a sender of the first session message is a session member other than the group owner or the administrator, and after changing the first operation permission to the second operation permission, the sender of the first session message is prevented from changing the second operation permission of the at least part of members on the first session message.

17. The device of claim 13, wherein the first user is a group owner or an administrator of the target session and a sender of the first session message is a session member other than the group owner or the administrator, and the actions further comprise:

after changing the first operation permission of the at least part of members of the target session on the first session message to the second operation permission, sending a notification message to the sender of the first session message.

18. The method of claim 1, wherein operations corresponding to the second operation permission exclude an operation related to message forwarding.

* * * * *